US011104097B2

(12) United States Patent
Hawley et al.

(10) Patent No.: US 11,104,097 B2
(45) Date of Patent: Aug. 31, 2021

(54) COMPOSITE STRUCTURAL ARTICLE (71) Applicant: INTEGRATED COMPOSITE PRODUCTS, INC., Rochester, MN (US)

(72) Inventors: Ronald Clare Hawley, Winona, MN (US); Derek Joel Mazula, Sioux Falls, SD (US)

(73) Assignee: INTEGRATED COMPOSITE PRODUCTS, INC., Rochester, MN (US)

(*) Notice: Subject to any disclaimer, the term of this patent is extended or adjusted under 35 U.S.C. 154(b) by 356 days.

(21) Appl. No.: 15/908,083

(22) Filed: Feb. 28, 2018

(65) Prior Publication Data
US 2018/0186116 A1 Jul. 5, 2018

Related U.S. Application Data (63) Continuation of application No. 14/621,188, filed on Feb. 12, 2015, now Pat. No. 10,016,953, which is a
(Continued)

(51) Int. Cl.
*B29C 70/08* (2006.01)
*B32B 3/30* (2006.01)
(Continued)

(52) U.S. Cl.
CPC ............ *B32B 3/30* (2013.01); *B29C 45/0005* (2013.01); *B29C 70/083* (2013.01);
(Continued)

(58) Field of Classification Search
CPC ....... B32B 3/30; B32B 5/028; B29C 45/0005; B29C 70/083; B29C 99/0014;
(Continued)

(56) References Cited

U.S. PATENT DOCUMENTS 2,545,981 A 3/1951 Warp
2,877,501 A 3/1959 Bradt
(Continued)

FOREIGN PATENT DOCUMENTS

CA 2366584 10/2000
EP 0552918 A1 7/1993
(Continued)

OTHER PUBLICATIONS

International Search Report and Written Opinion, dated Nov. 5, 2014, PCT Patent Application No. PCT/US2014/048048, 12 pgs.
(Continued)

*Primary Examiner* — Matthew J Daniels
*Assistant Examiner* — Shibin Liang
(74) *Attorney, Agent, or Firm* — Mueting Raasch Group (57) ABSTRACT

A composite structural article includes a polymeric body having a first major surface and an opposing second major surface. The composite structure includes a continuous fiber element extending along and embedded within the lateral length of a rib element and/or an open mesh woven element embedded within and coplanar a textured surface of the first major surface or the opposing second major surface.

18 Claims, 3 Drawing Sheets

Related U.S. Application Data continuation of application No. PCT/US2014/048048, filed on Jul. 24, 2014.

(60) Provisional application No. 61/857,806, filed on Jul. 24, 2013.

(51) Int. Cl.
*B29D 99/00* (2010.01)
*B29C 45/00* (2006.01)
*B32B 5/02* (2006.01)
*B29K 101/12* (2006.01)
*B29K 105/08* (2006.01)
*B29K 105/10* (2006.01)

(52) U.S. Cl.
CPC .......... *B29D 99/0014* (2013.01); *B32B 5/028* (2013.01); *B29K 2101/12* (2013.01); *B29K 2105/0809* (2013.01); *B29K 2105/101* (2013.01); *Y10T 428/2457* (2015.01); *Y10T 428/24355* (2015.01); *Y10T 428/24479* (2015.01); *Y10T 428/24612* (2015.01)

(58) Field of Classification Search
CPC ....... Y10T 428/24355; Y10T 428/2457; Y10T 428/24612; B29K 2101/12; B29K 2105/101; B29K 2105/0809
See application file for complete search history.

(56) References Cited

U.S. PATENT DOCUMENTS

| | | |
|---|---|---|
| 3,680,495 A | 8/1972 | Pike |
| 3,691,000 A | 9/1972 | Kalnin |
| 4,051,290 A | 9/1977 | Jutte et al. |
| 4,312,917 A | 1/1982 | Hawley |
| 4,357,292 A | 11/1982 | Myers |
| 4,492,607 A | 1/1985 | Halcomb |
| 4,623,281 A | 11/1986 | Verbauwhede et al. |
| 4,636,422 A | 1/1987 | Harris et al. |
| RE32,772 E | 10/1988 | Hawley |
| 4,937,032 A | 6/1990 | Krone et al. |
| 5,045,377 A | 9/1991 | Amata |
| 5,073,441 A | 12/1991 | Melec et al. |
| 5,246,520 A | 9/1993 | Scanlon et al. |
| 5,344,687 A | 9/1994 | Grimnes |
| 5,360,503 A | 11/1994 | Coffy |
| 5,460,673 A | 10/1995 | Cahuzac |
| 5,514,745 A | 5/1996 | Yoshino |
| 5,593,633 A | 1/1997 | Dull et al. |
| 5,868,080 A | 2/1999 | Wyler et al. |
| 6,054,177 A * | 4/2000 | Endoh ..................... B29B 15/12 156/166 |
| 6,368,701 B1 | 4/2002 | Nomura et al. |
| 6,655,299 B2 | 12/2003 | Preisler et al. |
| 6,844,040 B2 | 1/2005 | Pabedinskas et al. |
| 6,854,791 B1 * | 2/2005 | Jaggi ................... B62D 29/041 296/203.01 |
| 7,048,880 B2 | 5/2006 | Kia et al. |
| 7,592,388 B2 | 9/2009 | Wick et al. |
| 8,376,426 B2 | 2/2013 | Choi et al. |
| 8,815,368 B2 | 8/2014 | Neitzke |
| 8,985,034 B2 | 3/2015 | Dummett |
| 2003/0062647 A1 | 4/2003 | Deteresa et al. |
| 2010/0028616 A1 | 2/2010 | Yamanouchi et al. |
| 2010/0092770 A1 | 4/2010 | Wadahara et al. |
| 2010/0239856 A1 | 9/2010 | Olson et al. |
| 2012/0048154 A1 | 3/2012 | Toomer et al. |
| 2013/0164501 A1 | 6/2013 | Jung et al. |
| 2013/0309442 A1 | 11/2013 | Ruby et al. |
| 2014/0178635 A1 | 6/2014 | Imaizumi et al. |
| 2014/0186600 A1 | 7/2014 | Dyksterhouse |
| 2014/0196837 A1 | 7/2014 | Polewarczyk et al. |
| 2015/0151506 A1 | 6/2015 | Hawley et al. |

FOREIGN PATENT DOCUMENTS

| | | | |
|---|---|---|---|
| WO | WO 2010/108015 A2 | 9/2010 | |
| WO | 2012075282 | * 12/2010 | ............... B32B 5/14 |
| WO | WO 2013/021848 A1 | 2/2013 | |
| WO | WO 2013/032620 A1 | 3/2013 | |

OTHER PUBLICATIONS

International Preliminary Report on Patentability received in PCT/US2014/048048, dated Feb. 4, 2016; 8 pages.

* cited by examiner

COMPOSITE STRUCTURAL ARTICLE

RELATED APPLICATIONS

The present application is a continuation application of U.S. patent application Ser. No. 14/621,188, filed Feb. 12, 2015, which is a continuation application of International Application No. PCT/US2014/048048, titled COMPOSITE STRUCTURAL ARTICLE, filed on Jul. 24, 2014, which claims the benefit under 35 U.S.C. § 119(e) of U.S. Provisional Patent Application No. 61/857,806, filed on Jul. 24, 2013, and titled COMPOSITE STRUCTURAL ARTICLE, each of which is hereby incorporated by reference in their entirety.

BACKGROUND

The physical properties of thermoplastic polymers can be improved by the incorporation of filler materials such as glass fibers. The incorporation of glass fibers into polymeric products beneficially affects resin properties such as tensile strength, stiffness, dimensional stability and resistance to creep and thermal expansion. Traditional methods of producing such articles have been injection molding or compression molding standard, pre-compounded fiber glass-filled polymer. While satisfying certain objectives in optimizing the quality of the finished product, conventional filled products have proven to be commercially costly and in other ways have fallen short of their objectives in terms of weight, impact performance and strength. Improvements to producing fiber-reinforced articles are desired.

SUMMARY

The present disclosure relates to composite structural articles and in particular to composite structural articles that includes a continuous fiber tension element and/or open mesh woven element. The continuous fiber tension element and/or open mesh woven element can improve the structure properties while reducing the weight and/or cost of the composite structural article.

In one aspect, a composite structural article includes a polymeric body having a first major surface and an opposing second major surface, and a plurality of fibers forming a fiber dispersion within the polymeric body. The fibers have an average length of less than 15 mm and an average diameter of less than 50 micrometers. A laterally extending rib element extends away from the second major surface and has a lateral length forming a portion of the polymeric body. A continuous fiber element extends along and is embedded within the lateral length of the rib element. The continuous fiber element includes a plurality of parallel and co-extending continuous fibers and a resin.

In another aspect, a composite structural article includes a polymeric body having a first major surface and an opposing second major surface. The second major surface is a textured surface. An open mesh woven element is embedded within and coplanar the textured surface.

In a further aspect, composite structural articles described herein are formed by injection molding or compression molding.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

It should be noted that "top" and "bottom" (or other terms like "upper" and "lower" or "first" and "second") are utilized strictly for relative descriptions and do not imply any overall orientation of the article in which the described element is located.

The terms "tension member," "continuous fiber tension element," "continuous fiber member," "continuous fiber element," and "continuous fiber bundle" are used interchangeably herein.

The present disclosure relates to a composite structural article and in particular to composite structural articles that includes a continuous fiber tension element and/or open mesh woven impact element. In many embodiments the composite structural article includes a fiber dispersion. The continuous fiber tension element and/or open mesh woven impact element can improve the structure properties while reducing the weight and/or cost of the composite structural article. The continuous fiber members can provide tensile strength to the polymeric body. The continuous fiber members can be placed strategically within the polymeric body to provide tensile strength where it is needed within the polymeric body. The continuous fiber members can be embedded in laterally extending rib elements forming a portion of the polymeric body of the composite structural article, preferably distal end portions of the rib elements. In many embodiments an open mesh woven element is embedded within the polymeric body. The open mesh woven element can provide impact strength to the polymeric body. The open mesh woven element can be placed strategically within the polymeric body to provide impact strength where it is needed within the polymeric body. The open mesh woven element can be embedded in a textured surface of the polymeric body. In some embodiments, warping of the solid body is mitigated by utilizing both the continuous fiber members and/or the open mesh woven element. These composite structural articles can be formed of lightweight polymer materials. These composite structural articles possess a high strength, stiffness, and high impact resistant with a reduced weight as compared to conventional structural members. While the present disclosure is not so limited, an appreciation of various aspects of the disclosure will be gained through a discussion of the examples provided below.

The composite structural article described herein can be formed by injection molding, transfer molding or compression molding. Preferably the composite structural article described herein can be formed by injection molding. Surprising large planar composite structural articles have been formed that resist warping or shrinkage due to the tension and impact members described below. The composite structural article described herein can have any physical shape or structure.

Figure 1:
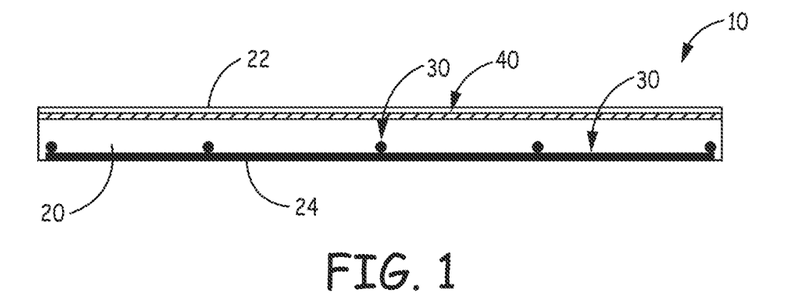
FIG. 1 is a cross-sectional schematic diagram view of an illustrative composite structural article including both tension and impact members and taken along line 1-1 in FIG. 3.
Figure 2:
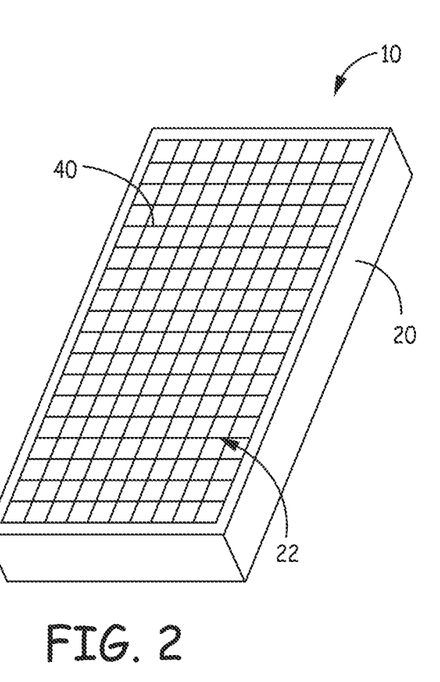
FIG. 2 is a top schematic diagram perspective view of an illustrative composite structural article including impact members.
Figure 3:
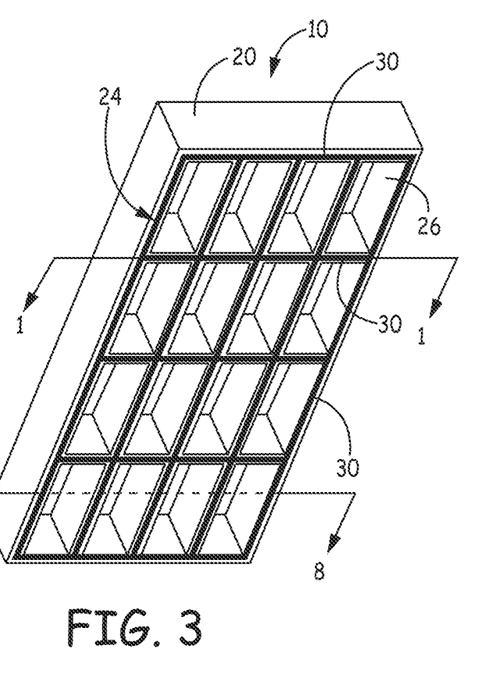
FIG. 3 is a bottom schematic diagram perspective view of an illustrative composite structural article including tension members.
Figure 8:
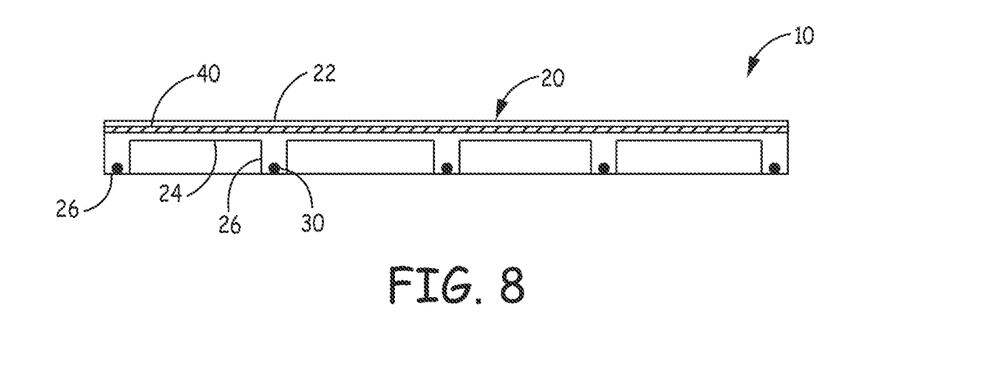
FIG. 8 is a cross-sectional schematic diagram view of an illustrative composite structural article including both tension and impact members and taken along line 8-8 in FIG. 3.

FIG. 1 and FIG. 8 are cross-sectional schematic diagram views of an illustrative composite structural article 10 including both tension 30 and impact members 40 taken along line 1-1 for FIG. 1 and along line 8-8 for FIG. 8. FIG. 2 is a top schematic diagram perspective view of an illustrative composite structural article 10 including impact members 40. FIG. 3 is a bottom schematic diagram perspective view of an illustrative composite structural article 10 including tension members 30.

The composite structural article 10 includes a polymeric body 20 having a first major surface 22 and an opposing second major surface 24. In many embodiments the first major surface 22 and an opposing second major surface 24 are planar and parallel to each other. In many embodiments a plurality of fibers form a fiber dispersion within the polymeric body 20. The fibers forming this fiber dispersion have an average length of less than 15 mm and an average diameter of less than 50 micrometers.

FIG. 1 illustrates an composite structural article 10 that includes a continuous fiber element (i.e., tension member) 30 extending along a length of the second major surface 24 and an open mesh woven element (i.e., impact member) 40 adjacent to and coplanar with the opposing first major surface 22. The continuous fiber element 30 includes a plurality of parallel and co-extending continuous fibers and a resin. FIG. 1 illustrates four continuous fiber elements 30 projection out of the page and one continuous fiber element 30 extending orthogonal to the four continuous fiber elements 30. It is understood that the composite structural article 10 can include any number of individual continuous fiber elements 30 parallel and/or orthogonal to each other.

FIG. 2 is a top schematic diagram perspective view of an illustrative composite structural article 10 including impact members 40. While the open mesh woven element 40 is illustrated as visible, it is understood that the open mesh woven element 40 is preferably embedded within the polymeric body 20 so that it would not necessarily be visible. In many embodiments the open mesh woven element 40 is embedded within and coplanar with the first major surface 22. In other embodiments the open mesh woven element 40 is embedded within and coplanar with the opposing second major surface 24.

Preferably the embedding surface is a textured surface. The term "textured" refers to a surface having uniform or non-uniform undulating surface or peaks and valleys along the surface having a lateral height difference equal to at least the diameter of the fiber bundles forming the open mesh woven element 40. In many embodiments the textured surface has uniform or non-uniform undulating or peaks and valleys having a lateral height difference equal to at two times or greater the diameter of the fiber bundles forming the open mesh woven element 40.

FIG. 3 is a bottom schematic diagram perspective view of an illustrative composite structural article 10 including tension members 30. The polymeric body 20 includes an elongated rib element 26 extending along and away from the first major surface 22 and an opposing second major surface 24. The continuous fiber element 30 is co-extensive with and embedded within the rib member 26. In many embodiments the continuous fiber element 30 is co-extensive with and embedded within a distal end portion (away from the opposing surfaces) rib element 26. While the continuous fiber element 30 is illustrated as visible, it is understood that the continuous fiber element 30 is preferably embedded within the polymeric body 20 or rib element 26 so that it would not necessarily be visible.

FIG. 3 illustrates an embodiment that includes a plurality of parallel extending continuous fiber elements 30. This figure illustrates a composite structural article 10 that includes a set of a first five parallel rib elements 26 and a second set of five parallel rib elements 26 that are orthogonal to each other. In some embodiments, the composite structural article 10 includes a plurality of parallel and orthogonal independent continuous fiber elements 30. Preferably the composite structural article 10 includes a fiber dispersion, as described below, within the polymeric body 20. The fiber dispersion can assist with reducing the warpage of composite structural articles 10 that includes the continuous fiber elements 30, as described herein.

Figure 4:
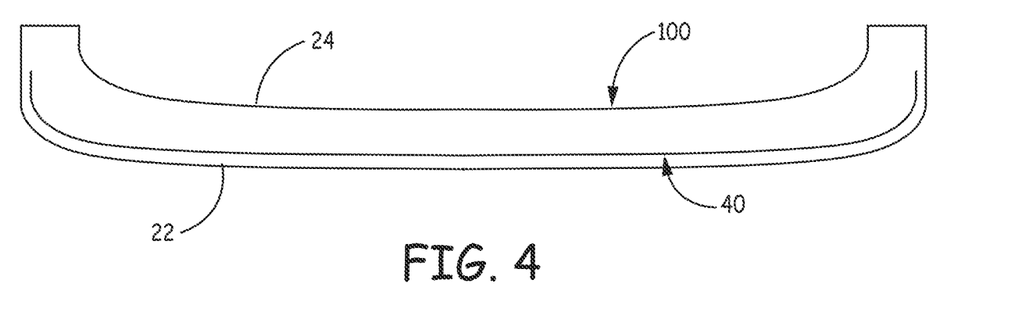
FIG. 4 is a top schematic diagram view of an illustrative curved composite structural article including impact members.
Figure 5:
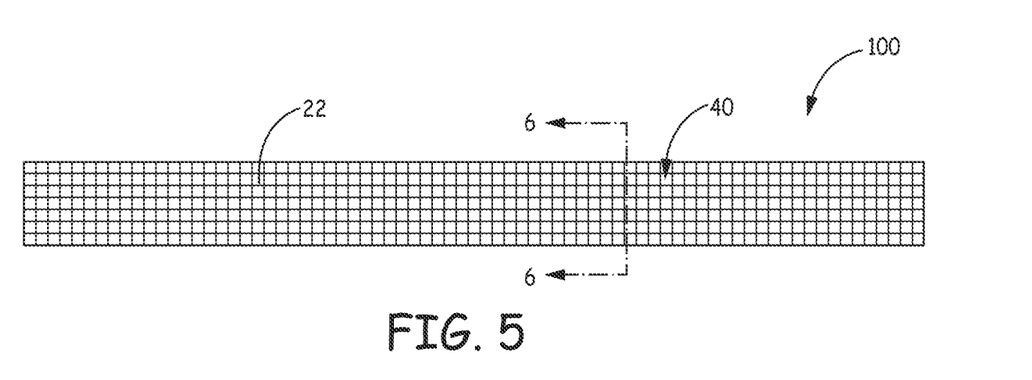
FIG. 5 is a front schematic diagram view of the illustrative curved composite structural article of FIG. 4.
Figure 6:
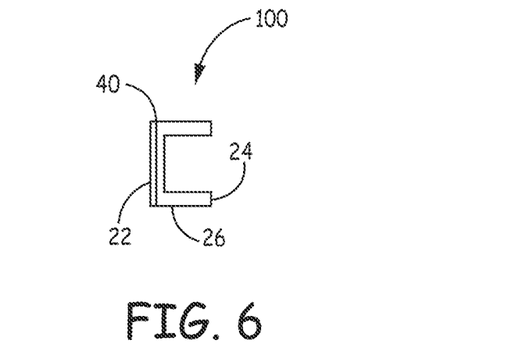
FIG. 6 is a cross-sectional schematic diagram view of the illustrative curved composite structural article of FIG. 4 taken along line 6-6.

FIG. 4 is a top schematic diagram view of an illustrative curved composite structural article 100 including an impact member 40. FIG. 5 is a front schematic diagram view of the illustrative curved composite structural article 100 of FIG. 4. FIG. 6 is a cross-sectional schematic diagram view of the illustrative curved composite structural article 100 of FIG. 4 taken along line 6-6.

FIG. 4 is a top schematic diagram view of the illustrative curved composite structural article 100 illustrating the embedded open mesh woven element 40 being co-extensive with the first major surface 22 of the polymeric body 20. The opposing second major surface 24 generally curves also. FIG. 5 is a front schematic diagram view of the illustrative curved composite structural article 100, while the open mesh woven element 40 is illustrated as visible, it is understood that the open mesh woven element 40 is preferably embedded within the polymeric body 20 (as illustrated in FIG. 4, so that it would not necessarily be visible. Preferably the embedding surface is textured as described above.

Figure 7:
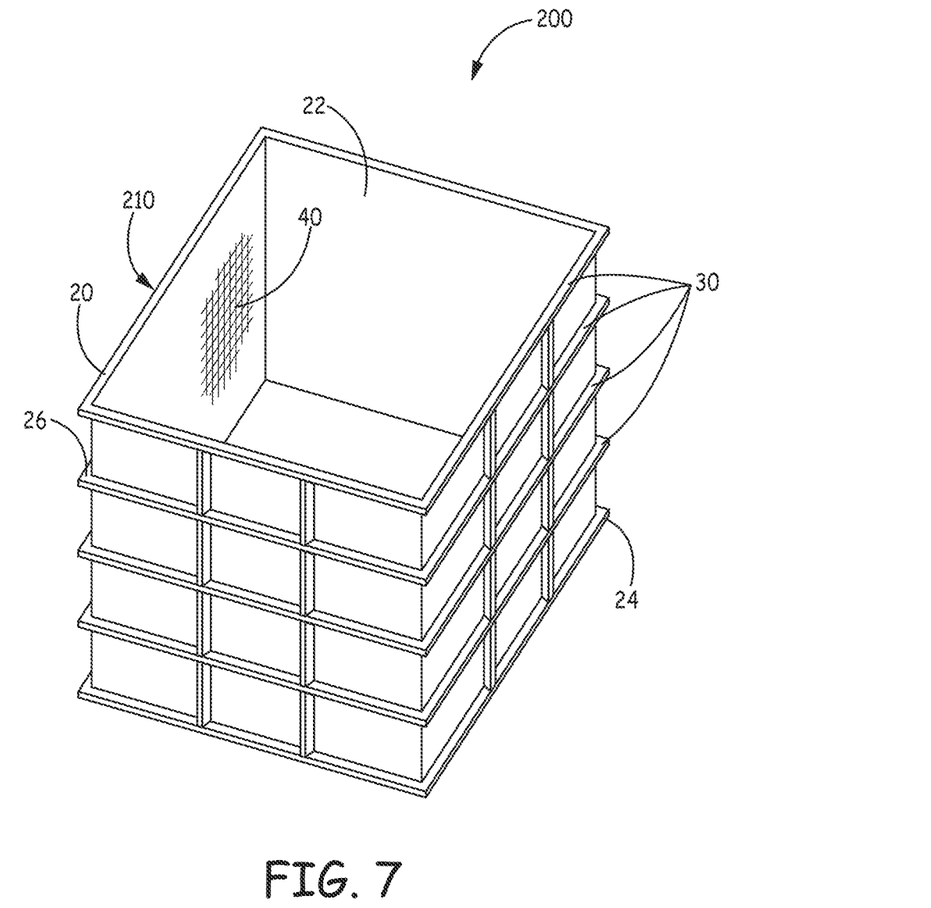
FIG. 7 is a perspective view of a container formed of composite structural articles including both tension and impact members.

FIG. 7 is a perspective view of a container 200 formed of composite structural articles 210 including both tension 30 and impact members 40. The container 200 is formed of at least four composite structural articles 210. Each composite structural article 210, or side of the container 200, includes continuous fiber elements 30 extending along a length of ribs 26 on the second major surface 24 and an open mesh woven element 40 embedded in and coplanar with the opposing first major surface 22. The continuous fiber element 30 includes a plurality of parallel and co-extending continuous fibers and a resin.

In this embodiment, the first major surface 22 is planar and the second major surface 24 includes a plurality of intersecting rib elements 26 that extend away from the second major surface 24. A first plurality of parallel rib 26 elements extend along a length of the panel member and a second plurality of parallel rib elements 26 extend along a width of the panel members. The first plurality of rib elements 26 intersect and are orthogonal to the second plurality of rib elements 26. The continuous fiber member is located within or embedded within one or more or all of the rib elements 26, as described above. The panel member 210 can include one or more open mesh woven element 40 disposed within the panel member 210 and on or between the first major surface 22 and an opposing second major surface 24, as described above.

The solid or polymeric body can be formed of any suitable polymeric material. In many embodiments the polymeric material is a thermoplastic material. Useful polymeric material includes polypropylene, polyethylene, nylon, acrylonitrile butadiene styrene, styrene acrylonitrile, acrylic or styrene, for example. Further useful polymers include PBT polyester, PET polyester, polyoxymethylene, polycarbonite or polyphenylene sulfide for example. Higher temperature polymeric material includes polysulfone, polyethersulfone, polyethereetherketone, or liquid crystal polymer, for example.

The polymeric material can include a plurality of random fibers forming a fiber dispersion in the polymeric material. This fiber dispersion has an average fiber length of less than 15 mm or less than 12 mm or less than 5 mm or less than 1 mm. The fiber dispersion has an average fiber length in a range from 1 to 15 mm or in a range from 5 to 12 mm and can be termed "long fiber thermoplastic". In other embodiments, the fiber dispersion has an average fiber length in a range from 0.1 to 1 mm or in a range from 0.25 to 0.75 mm and can be termed "short fiber thermoplastic". The fibers forming this fiber dispersion can be formed of materials that are the same or different than the material forming the continuous fiber members such as glass, carbon, basalt, graphite, DuPont Kevlar brand aramid fibers, ceramics, natural fibers, polymeric fibers, and various metals, for example.

The fiber dispersion can be present in the polymeric material in a range from 5 to 60% by weight. Preferably the fiber dispersion can be present in the polymeric material in a range from 10 to 50% by weight, or in a range from 20 to 45% by weight, or in a range from 30 to 40% by weight. Useful polymeric material with fiber dispersions are commercially available from RTP Company, Winona, Minnesota under the trade designations "RTP 107" (polypropylene with 40% wt short glass fiber dispersion) and "RTP 80107" (polypropylene with 40% wt long glass fiber dispersion), for example.

The continuous fiber members can be formed of any suitable fiber material providing tensile strength. A plurality of continuous fibers can extend along a longitudinal axis in a parallel and co-extensive manner as a continuous fiber element or bundle held together with a resin. The continuous fibers can be composed of: glass, carbon, graphite, DuPont Kevlar brand aramid fibers, ceramics, natural fibers, polymeric fibers, and various metals. Each continuous fiber element or bundle can have a diameter in a range from 250 to 5000 micrometers or from 500 to 4000 micrometers or from 1000 to 3000 micrometers. Each continuous fiber element or bundle can have at least 40% wt fiber or at least 50% wt fiber or from 40 to 90% wt fiber or from 50 to 80% wt fiber. Each continuous fiber element or bundle can have at from 60 to 10% wt resin or from 50 to 30% wt resin.

In many embodiments the resin utilized to form the continuous fiber element or bundle is compatible with, or is the same type or kind of, resin material forming the solid or polymeric body of the composite structural element. This configuration will provide a strong bond between the continuous fiber element or bundle and the resin material forming the solid or polymeric body of the composite structural element.

The continuous fibers can have any suitable diameter such as 5 to 100 micrometers or less than 50 micrometers or from 10 to 50 micrometers or from for example 10 to 30 micrometers. The continuous fiber members or bundles are formed of a plurality of parallel and co-extending continuous fibers. Preferably the continuous fiber members or bundles are formed of at least 1000 individual and parallel and co-extending continuous fibers or at least 2500 individual and parallel and co-extending continuous fibers or at least 5000 individual and parallel and co-extending continuous fibers or at least 7500 individual and parallel and co-extending continuous fibers. The plurality of parallel and co-extending continuous fibers are disposed within a resin to form the continuous fiber element or bundle, as described above.

The continuous fiber can have any suitable length and is typically at least as long as the desired area of reinforcement such as the length of a rib member described below. In many embodiments the continuous fiber extends continuously along a majority of the first or second opposing surfaces. In many embodiments the continuous fiber has a length of at least 0.1 meter, or 0.5 meter or 1 meter or greater than 1 meter. Testing has confirmed that just the addition of the continuous fiber element or bundle, described above, can improve the structural or flexural or tensile strength of the composite article by at least two to three times over articles without the continuous fiber element or bundle.

The open mesh woven element or fiber mesh can be formed of any suitable fiber material providing tensile strength in two orthogonal directions and impact resistance. The open mesh woven element or fiber mesh can be formed of a plurality of first parallel fibers extending in a first direction in a plane and a plurality of second parallel fibers extending in a second direction (orthogonal to the first direction) in the plane. The first plurality and second plurality of fibers can be composed of: glass, basalt, carbon, graphite, DuPont Kevlar brand aramid fibers, ceramics, natural fibers, polymeric fibers, and various metals.

The fiber mesh can have any useful void size separating the intersecting fibers. In preferred embodiments the openings are in a range from about ⅛ inch to about ½ inch square or in mesh size of about 8 to about 2 mesh or from about 4 to about 5 mesh (openings per inch). In many embodiments the opening have an average lateral distance of at least 1 mm or at least 2 mm or at least 5 mm. The fiber mesh can have any useful weight. In many embodiments the fiber mesh has a weight in a range from 2 to 20 $oz/yd^2$ or from 2 to 10 $oz/yd^2$ or from 3 to 6 $oz/yd^2$.

The open mesh woven element or fiber mesh can include a resin or other chemical coating to promote adhesion of the open mesh woven element to the resin material forming the solid or polymeric body of the composite structural element. In some embodiments the open mesh woven element or fiber mesh can includes a resin coating on the open mesh woven element that is the same material or compatible with the resin material forming the solid or polymeric body of the composite structural element. In other embodiments the open mesh woven element or fiber mesh can includes a resin coating on the open mesh woven element that is not the same material or is not compatible with the resin material forming the solid or polymeric body of the composite structural element. This "non-compatible" resin configuration surprising provides a resilient composite structural element.

The open mesh woven element or fiber mesh can include a continuous fiber material as described above for the continuous fiber members or bundles. While some of these open mesh woven elements include a resin coating, many embodiments include no resin or are resin free. Useful open mesh woven elements or fiber meshes are commercially available from Saint-Gobain Adfors, France, under the trade designation "FibaTape".

The composite structural article can be formed by any suitable method. In many embodiments the continuous fiber members and the fiber mesh elements can be placed in a suitable mold and the polymeric material disposed into the mold to form the composite structural article. Preferably the composite structural articles are formed by inserting the continuous fiber members and the fiber mesh elements in a mold and polymer material is compression molded or injection molded about the continuous fiber members and the fiber mesh elements.

Since the composite structural article described herein resists warping, the composite structural article can be formed quickly and without cumbersome or capital intensive cooling equipment that is normally employed to inhibit warping of the composite structural article. It has been discovered that selective placement of the continuous fiber members and the fiber mesh elements surprising inhibits warping of the composite structural article.

The open mesh woven element and/or continuous fiber element or bundle described herein can be utilized in structural composite articles for a variety of industries, markets and applications. The composite articles described herein are particularly useful for: automotive parts such as bumpers, fenders; transportation such as pallets and containers; aerospace such as airplane components; military such as missile components; recreation such as vehicle frame components.

EXAMPLES

All parts, percentages, ratios, etc. in the examples are by weight, unless noted otherwise.

Example 1—Composite Member with Tension Member

A composite member was formed having opposing first and second planar surfaces and a rib element extending from the second surface. The composite member was formed from polypropylene and 40% wt long fiber dispersion (RTP 80107 from RTP Company). The fiber dispersion had an average length of about 12 mm and an average diameter of about 20 micrometers. A tension member was embedded within and along the entire length of the composite member rib. The tension member was a continuous fiber bundle or element formed of several thousand parallel and co-extending glass fibers and held together with polypropylene resin. The continuous fiber bundle was 60% wt glass fibers. The continuous fiber bundle had a diameter of about 0.1 inch or about 2500 micrometers. The composite member weighed 11.7 grams.

A comparison member was formed with polypropylene and 40% wt long fiber dispersion (RTP 80107 from RTP Company) without the tension member (continuous fiber bundle or element) in the rib element or within the member. The comparison member weighed 11.6 grams.

Results

Flexural strength testing (Three Point Flex test on 4.5" span) was performed on both the composite member of Example 1 and the comparison member of Example 1. The comparison member had a tensile strength of about 5,000 psi. The composite member had a tensile strength of about 300,000 psi.

Yield force testing was performed on both the composite member of Example 1 and the comparison member of Example 1. The comparison member had a yield force of about 138 lbs. The composite member had a yield force of about 262 lbs.

Example 2—Composite Member with Impact Member

The composite member was formed by injection molding polypropylene and 40% wt long fiber dispersion (RTP 80107 from RTP Company) into a 4 inch diameter mold along with an open mesh woven element. The fiber dispersion had an average length of about 12 mm and an average diameter of about 20 micrometers. The impact member was an open mesh woven element having 2 $oz/yd^2$ glass fiber mesh with 8 fiber bundles per inch (Saint-Gobain Adfors, France).

A comparison member was formed with polypropylene and 40% wt long fiber dispersion (RTP 80107 from RTP Company) without the impact member (open mesh woven element).

Results

Impact strength testing (Instrumented Dynatup test) was performed on both the composite member of Example 2 and the comparison member of Example 2. The composite member with stood two to three times the impact force before break as compared to the comparison member of Example 2.

Further samples using different weights of open mesh woven elements were formed and tested for failure. The polymer resin was a polypropylene co-polymer resin without the fiber dispersion. Results of the testing are reported below in Table 1.

TABLE 1

| Impact Member | Impact Test (ft-lbs to failure) |
|---|---|
| None | 155 |
| 1.8 oz/yd$^2$ | 212 |
| 2 oz/yd$^2$ | 285 |
| 4.5 oz/yd$^2$ | 339 |
| 12 oz/yd$^2$ | Did not break at 370 |
| 15 oz/yd$^2$ | Did not break at 370 |
| 20 oz/yd$^2$ | Did not break at 370 |

Example 3—Composite Member with Tension Member and Impact Member

A mold was utilized as illustrated in FIG. 1-3. Dimensions of the mold were 8 in wide by 18 in long by 1 in thick. Five ribs ran parallel to the width and five ribs ran parallel to the length. The width ribs were orthogonal to the length ribs.

Composite articles (with the tension members) were formed using polypropylene and either 40% wt long fiber dispersion (RTP 80107 from RTP Company) or 30% wt long fiber dispersion (RTP 80105 from RTP Company) or 20% wt long fiber dispersion (RTP 80103 from RTP Company). One tension member (as described in Example 1) is embedded within each rib element. Comparative examples did not include the tension member.

Results

The following Table 2 reports the results of flexural testing (Three Point Flex test on 15" span).

TABLE 2

| Material Description | Flexural Test (pounds to failure) |
|---|---|
| RTP 80107 40% fiber | 686 |
| RTP 80107 40% fiber + tension member | 1395 |
| RTP 80107 30% fiber | 620 |
| RTP 80107 30% fiber + tension member | 1276 |
| RTP 80107 20% fiber | 554 |
| RTP 80107 20% fiber + tension member | 1158 |

The above results illustrate that the continuous fiber bundle or tension member increased the flexural strength of the composite member by two to three times without adding weight to the composite member.

Next, composite articles (with tension members and impact members) were formed using polypropylene and either 40% wt long fiber dispersion (RTP 80107 from RTP Company) or 20% wt long fiber dispersion (RTP 80103 from RTP Company). One tension member (as described in Example 1) is embedded within each rib element. The impact member (4.5 oz/yd glass fiber mesh at 4 mesh—FibaTape from Saint-Gobain Adfors, France) was embedded within the planar surface of the as illustrated in FIG. 1. Comparative examples did not include the tension member.

Results

The following Table 3 reports the results of impact testing (falling dart).

TABLE 3

| Material Description | Impact Test (ft-lbs to failure) |
|---|---|
| RTP 80107 40% fiber | 37 |
| RTP 80107 40% fiber + tension member | 48 |
| RTP 80107 40% fiber + tension member + impact member | 53 |
| RTP 80107 20% fiber | 32 |
| RTP 80107 20% fiber + tension member | 37 |
| RTP 80107 20% fiber + tension member + impact member | 42 |

The above results illustrate that the continuous fiber bundle or tension member increased the impact strength of the composite member and the addition of the impact member further increased the impact strength of the composite member.

Thus, embodiments of COMPOSITE STRUCTURAL ARTICLE are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A method of forming a composite structural article, the method comprising:
    inserting a solid elongated continuous fiber element into a mold cavity, the solid elongated continuous fiber element comprising at least 1000 parallel and co-extending continuous fibers and solid resin dispersed within the continuous fibers, the solid elongated continuous fiber element has a resin concentration from 50% wt to 30% wt, and a diameter in a range from 250 micrometers to 5000 micrometers;
    flowing thermoplastic polymer into the mold cavity and immersing the entire solid elongated continuous fiber element within the thermoplastic polymer, the thermoplastic polymer comprising a fiber dispersion; and
    solidifying the thermoplastic polymer to form a composite structural article, the composite structural article comprising a rib element extending away from major surface of the composite structural article and the elongated continuous fiber element extending parallel with a longitudinal axis of the rib element and being embedded within the rib element and surrounded by the thermoplastic polymer.

2. The method according to claim 1, wherein the flowing step comprises flowing thermoplastic polymer comprising a fiber dispersion having an average length of less than 15 mm and an average diameter of less than 50 micrometers.

3. The method according to claim 1, wherein the inserting step comprises inserting the solid elongated continuous fiber element comprising at least 2500 parallel and co-extending continuous glass fibers.

4. The method according to claim 1, wherein the flowing step comprises flowing thermoplastic polymer comprising a fiber dispersion having an average length of less than 1 mm and an average diameter of less than 50 micrometers.

5. The method according to claim 1, wherein the flowing step comprises flowing thermoplastic polymer comprising a 10% to 50% by weight fiber dispersion.

6. The method according to claim 1, wherein the flowing step comprises flowing thermoplastic polymer comprising polypropylene, polyethylene, nylon, acrylonitrile butadiene styrene, styrene acrylonitrile, acrylic or styrene.

7. The method according to claim 1, wherein the flowing step comprises flowing thermoplastic polymer comprising PBT polyester, PET polyester, polyoxymethylene, polycarbonate, polyphenylene sulfide, polysulfone, polyethersulfone, polyethereetherketone, or liquid crystal polymer.

8. The method according to claim 1, wherein the solidifying step comprises solidifying the thermoplastic polymer and the elongated continuous fiber element extending an entire longitudinal length of the rib element.

9. The method according to claim 1, wherein the flowing step comprises injection molding the thermoplastic polymer into the mold cavity.

10. The method according to claim 1, wherein the flowing step comprises compression molding the thermoplastic polymer into the mold cavity.

11. The method according to claim 1, wherein the inserting step comprises inserting two or more solid elongated continuous fiber elements into the mold cavity.

12. The method according to claim 1, wherein the inserting step comprises inserting the solid elongated continuous fiber element comprising at least 5000 parallel and co-extending continuous glass fibers.

13. The method according to claim 11, wherein the solidifying step comprises solidifying the thermoplastic polymer to form a composite structural article, the composite structural article comprising at least two rib elements extending away from major surface of the composite structural article and each respective elongated continuous fiber element extending parallel with a longitudinal axis of each respective rib element and being embedded within each respective rib element.

14. A method of forming a composite structural article, the method comprising:
  inserting a solid elongated continuous fiber element into a mold cavity, the solid elongated continuous fiber element comprising at least 1000 parallel and co-extending continuous fibers and solid thermoplastic resin dispersed within the continuous fibers, the solid elongated continuous fiber element has a resin concentration from 50% wt to 30% wt, and a diameter in a range from 250 micrometers to 5000 micrometers;
  flowing thermoplastic polymer into the mold cavity and immersing the entire solid elongated continuous fiber element within the thermoplastic polymer, the thermoplastic polymer comprising a fiber dispersion; and
  solidifying the thermoplastic polymer to form a composite structural article, the composite structural article comprising a rib element extending away from major surface of the composite structural article and the elongated continuous fiber element extending parallel with a longitudinal axis of the rib element and being embedded within the rib element, the parallel and co-extending continuous fibers are parallel with the longitudinal axis of the rib element and surrounded by the thermoplastic polymer.

15. The method according to claim 14, wherein the inserting step comprises inserting the solid elongated continuous fiber element comprising at least 2500 parallel and co-extending continuous glass fibers.

16. The method according to claim 15, wherein the flowing step comprises flowing thermoplastic polymer comprising a fiber dispersion having an average length of less than 15 mm and an average diameter of less than 50 micrometers.

17. The method according to claim 14, wherein the flowing step comprises flowing thermoplastic polymer comprising a 10% to 50% by weight fiber dispersion.

18. The method according to claim 17, wherein the solidifying step comprises solidifying the thermoplastic polymer and the elongated continuous fiber element extending an entire longitudinal length of the rib element.

* * * * *